Patented Oct. 18, 1938

2,133,335

UNITED STATES PATENT OFFICE 2,133,335

COATING AND ADHESIVE COMPOSITION AND PROCESS OF MAKING THE SAME

William Courtney Wilson and Charles Elliott Fawkes, Chicago, Ill., assignors to Pyroxylin Products Incorporated, Chicago, Ill., a corporation of Illinois No Drawing. Application December 5, 1934, Serial No. 756,084

8 Claims. (Cl. 134—26)

This invention relates to a new composition having a protein base and a urea derivative, suitable for many and varied uses; and the present application is a continuation in part of our co-pending application Serial No. 676,317 filed June 17, 1933.

It is the prime object of the present invention to provide solutions of protein materials having incorporated therein urea derivatives, suitable for use as coating or film forming compositions, and for numerous other uses.

Other prime objects in the making of such compositions are to provide:

(a) A coating material including a protein or protein derivative to which other coatings such as cellulose ester or ether base lacquers, paints, oleoresinous and synthetic resin varnishes will adhere;

(b) A solution of a protein and urea derivatives which upon the evaporation of the solvent readily becomes, or can readily be made to become, relatively insoluble in the original solvent; and (c) A solution of a protein material and a urea-aldehyde derivative which, upon the evaporation of the solvent, will leave a relatively insoluble film or coating.

Other prime objects of the present invention center about the provision of a coating material useful for protective or decorative purposes, the further provision of a flexible grease and/or oil proof coating material that is also resistant to the action of moisture or water, and the still further provision of an adhesive whose flexibility can be regulated for cementing together various surfaces, and which adhesive is resistant to water and water vapor.

In U. S. Patent 1,918,692, it is shown that the addition of substantially non-volatile substances that are soluble in both water and in solvents used in lacquers or varnishes will render a glue surface capable of holding, firmly bound, other finishing materials such as lacquers, shellac, varnish and the like. Among the materials that are shown to be useful for this purpose are water soluble glycerol esters.

In our co-pending application Serial No. 676,317 we have shown that urea derivatives in combination with protein materials give products that are extremely valuable for many purposes, and that products heretofore unknown may be secured thereby. Among such derivatives mention is made of mono- and di-methyl and ethyl urea, or thiourea, monomethylol urea, dimethylol urea, monomethylol and dimethylol thiourea, phenyl urea and the like.

We have found that reaction products of formaldehyde and urea or thiourea, or of formaldehyde and mixtures of urea and thiourea, which are or can be made to become soluble in water are especially useful in our invention. Among such products that are useful in our process may be mentioned the urea-formaldehyde, or thiourea formaldehyde condensation products and especially those which are soluble, or can be made to become soluble, in water. Many of these products are resinous in nature and may become infusible and insoluble in their final state.

As protein materials we may use substantially any water soluble protein or protein derivative such as glue, or gelatin, blood albumin, egg albumin, vegetable proteins and the like, or protein materials which can be made to dissolve in water, as for example casein.

We are aware that casein is soluble in strong urea solutions, and that urea itself, in concentrated water solutions, acts like other alkaline materials, such as borax, trisodium phosphate, sodium carbonate, ammonia and the like to cause casein to dissolve in water. Such use of urea is described for example by Max Landecker in his U. S. Patent 1,725,805 of August 27, 1929. Such use requires excessive amounts of urea to produce the required pH value or alkalinity to cause the casein to dissolve, so that in such solutions the urea predominates. Our use of urea derivatives does not contemplate their use for the production of alkalinity to dissolve casein or other proteins, although where casein is used in our process we may make use of any of the well-known agents which cause casein to dissolve in water. Furthermore, such use of urea to dissolve casein does not produce the characteristics of rendering the protein base capable of holding finish coats more firmly bound, or of rendering the casein less soluble, either or both of which may be secured by urea derivatives such as herein described. Urea or thiourea are therefore not equivalents to the urea or thiourea derivatives used in our process.

As far as we are aware, we are the first to produce solutions containing urea-aldehyde condensation products and proteins. Furthermore, it has not heretofore been known, as far as we are aware, that urea-aldehyde condensation products can be used in conjunction with protein materials to produce solutions which may be stored, but which, after evaporation of the solvent, become or may be made to become, relatively insoluble in the original solvent.

It would normally be expected that protein materials such as casein or glue would not be soluble in the same solution as a urea-aldehyde reaction product due to their effect upon each other. Proteins are rendered insoluble by aldehydes, and especially formaldehyde as is well known. Furthermore, it is difficult to prepare solutions of urea-aldehyde condensation products that will keep, as has been pointed out in U. S. Patent No. 1,926,786 of Novotny and Wilson. We have found, however, that by controlling the conditions, solutions of good keeping qualities can be prepared from condensation products of urea or of urea and/or thiourea and formaldehyde, and soluble proteins such as casein, glue, albumins, etc.

We have discovered that stable solutions may readily be prepared by adding a protein, preferably in finely divided condition, to a properly prepared water solution of a urea-aldehyde condensation product. We prefer to use condensation products of urea or urea and/or thiourea, or urea engendering materials, with formaldehyde, paraformaldehyd, and the like, and especially such products as are water soluble, and preferably of a resinous nature when free from solvent. Such urea-formaldehyde products as may either be prepared as solutions, or may be dissolved in water are useful for our process. As protein materials we may use such materials as glue, gelatine, casein, blood albumin, egg albumin, vegetable proteins and the like which are soluble or can be made to become soluble under the conditions of our process.

For the sake of brevity throughout the specification we use the term urea derivative but it is to be understood that where the term urea is used we include thiourea and compounds which generate urea or thiourea such as ammonium cyanate or thiocyanate and other compounds which have chemical properties similar to urea.

Since the formaldehyde derivatives of urea and/or thiourea appear to be reactive toward protein materials, considerable care must be observed in their use in the practice of our invention. Although we do not know the exact nature of the effect of the urea-aldehyde condensation product on the protein material, we believe that a chemical reaction takes place to produce an entirely new and hitherto unknown product or products. Although our invention provides solutions, these solutions have certain peculiar properties which differentiate them from either solutions of proteins, or solutions of urea-aldehyde condensation products. Unlike the solutions of urea-aldehyde condensation products, there is no apparent tendency for the formation of precipitates, so that solutions can be made which will keep over relatively long periods of time. Also there is no tendency toward the formation of two layers which is often the case in the preparation of urea-formaldehyde resins. Furthermore, the solutions appear to be more tolerant toward organic solvents and organic modifying agents than are solutions of the corresponding protein material. There is little or no tendency toward protein spoilage by organism such as bacteria. Also in many cases the viscosity is less than the corresponding solution of protein alone. In some of our compositions the addition of water beyond a certain amount causes a precipitate to form, whereas the same protein and the same urea-aldehyde derivative in the same concentrations will stand very great dilution without precipitating.

After evaporation of the solvent, the product becomes less and less affected by water, and after a relatively short period of time, depending upon the composition and the conditions of exposure, products can be made by our process which will not redissolve in the original solvent. Furthermore, our process enables us to make products which, after evaporation of the solvents do not soften or become tacky under conditions of high relative humidity, nor does it become dry and brittle under conditions of low relative humidity.

In order to make our process clear the following examples are given by way of illustration. It is to be understood that wide variations may be made in the materials used, in the proportions and in the procedure without departing from the spirit of our invention. It is to be further understood that the method of preparing the urea derivatives is not a part of our invention, since water soluble urea derivatives, however made, may be used in our process.

*Example 1*

From 10 to 50 parts of glue is mixed with 50 to 90 parts of cold water and the glue allowed to "swell". The "swelling" consists of the penetration of the water into the glue, so that the mixture becomes jelly like. Depending upon the size of the glue particles, and the grade of glue, this requires from 10 minutes to 24 hours. In practice, it usually is preferable to allow the swelling to continue until there are no hard particles of glue remaining. The swelled glue and water mixture is then warmed until the mass "liquefies", which is indicated by the jell turning to a liquid, such as is well-known in preparing gelatine jells. When the glue and water have completely liquefied, there is added, say from 1 to 25 parts of a water soluble urea derivative, such as mono- or di-methylol urea, mono- or di-methyl urea, or ethyl urea. For some purposes we prefer a urea derivative that is also soluble in organic solvents, as for example, where the glue solution is to be applied as a coating or finishing material and other finishing materials such as lacquers, varnishes, paints and the like, are to be applied over the protein base coat.

We have found that these urea derivatives not only increase the adherence of the protein base film, but also act as preservatives. Furthermore, the flexibility may be increased. Many of the urea derivatives, and especially the formaldehyde derivatives act as tanning or curing agents and cause the protein to become insoluble in water after the evaporation of the solvent.

*Example 2*

A water soluble urea formaldehyde condensation product is made by mixing:

120 parts by weight of urea
15 parts by weight of hexamethylenetetramine
300 parts by weight of formaldehyde (40% by volume)

This mixture is heated, as on a water bath, or other suitable means, and refluxed from 1 to 2 hours, and then 4 parts by weight of sodium acetate dissolved in say 15 parts by weight of water is added. A water solution is thus obtained of a resinous urea-formaldehyde condensation product. This solution may then be added to a glue solution, as for example, a solution composed of 40 parts by weight of a low grade glue and 60 parts by weight of water, or a glue solution such as that described in Example 1. Although this solution of urea-formaldehyde condensation product may be mixed in almost any proportion with, say a 40% glue solution up to at least equal amounts, such large proportions as equal parts have a tendency to jell in a few days. Where smaller proportions of the urea-aldehyde reaction product is used, the tendency to jell is greatly reduced, and solutions may be made that can be kept over long periods of time. We have further found that the addition of ammonia, or of urea retard or prevent the solution from turning to an insoluble jell during storage. Ammonia is especially advantageous for this purpose because of its volatility, thus allowing the composition to rapidly become water insoluble after application and evaporation of the solvent. Urea-formaldehyde condensation products such as described above render the glue more or less insoluble in water after drying, depending upon the amount of urea-formaldehyde product added. Furthermore, these water soluble urea-formaldehyde reaction products act as preservatives for proteins, and also provide products having a greater range of adhesiveness which is useful, for example in causing them to hold further coating materials firmly bound.

Example 3

100 parts by weight of photographic gelatine is "swelled" with 400 parts by weight of water. After standing for say 12 hours, the swelled gelatine is "converted" by warming until liquefaction takes place. To this gelatine solution may be added a urea aldehyde resin solution such as those described in the Novotny and Wilson Patent No. 1,926,786. Depending upon the results desired, the two solutions may be mixed in almost any proportions. The jell temperature of the gelatine decreases as the proportion of urea-aldehyde resin solution is increased. The flexibility of films made from gelatine and urea-aldehyde resin also increases as the proportion of urea-aldehyde resin is increased. Furthermore, the addition of from 50 to 200 parts of the urea-aldehyde resin solution to 500 parts of the gelatine solution renders the gelatine much more resistant to water.

It is well-known that photographic gelatine does not adhere well to nitrocellulose base lacquers, this fact being made use of in the preparation of gelatine films and sheets. The addition of relatively small proportions of urea-formaldehyde resin solutions greatly increases the adherence of the gelatine. For example, if ten parts by weight of the urea-aldehyde resin solution referred to above is added to 100 parts by weight of the gelatine solution described above, it is extremely difficult to strip the resulting film from a prepared cellulose nitrate surface ordinarily used for preparing gelatine films.

A product such as described above is useful in the manner and for the purposes described in the Fawkes Patent 1,918,692, and also as an adhesive and for many other purposes as will be readily understood.

Example 4

50 parts by weight of blood albumin is dissolved in 70 parts by weight of water. To this solution is added from 10 to 35 parts by weight of a neutral urea-thiourea-formaldehyde condensation product containing 50% resin and 50% water, such, for example, as that described in Example 5. The resulting product is highly resistant to bacterial and mould growth. Furthermore, when dry, the product is highly resistant to water, or for that matter, may become entirely water insoluble. For example, if 40 parts by weight of a solution of urea-thiourea-formaldehyde condensation product such as that described in Example 5 is used with 100 parts by weight of the above albumin solution, a viscous product is obtained which becomes insoluble in water after drying. Some care must be used when large amounts of the urea-formaldehyde condensation product is used since such solutions have a tendency to form jells, after standing for some time. Where it is desirable to use relatively large amounts of a urea or thiourea-formaldehyde derivative as, for example, when 20 parts of dimethylol urea is substituted for the urea-aldehyde resin solution added to 100 parts of the above blood albumin solution, the resulting product should be made up as used. The products made from blood albumin are especially useful as adhesives where great strength of joint is required.

Example 5

| | Parts by weight |
|---|---|
| Ammonia (28%) | 5.5 |
| Water | 85 |
| Urea | 65 |
| *Urea-aldehyde resin solution | 60 |
| Casein | 85 |
| | 300.5 |

*The urea-aldehyde resin solution is prepared by reacting 275 parts of formalin (commercial 40% formaldehyde) with 100 parts of thiourea and 40 parts of urea in the presence of about one part of barium hydroxide. To the resulting product, 3 parts of 28% ammonia is added, and then carbon dioxide passed in until the solution is neutral.

In this example, the urea, water, ammonia and urea-aldehyde resin solution are mixed and stirred until the urea is dissolved. To this solution, the casein, preferably in a pulverized or granular form, is added and stirred. The casein dissolves in a short time to produce a clear viscous solution suitable for use as an adhesive, a size, and for many other purposes.

If for certain uses the above solution is too viscous, it may be thinned by the addition of water or a mixture of three parts water and 1 part alcohol by weight. Care must be used in thinning the solution, since an excess of solvent may cause the product to separate as a white pasty mass. When 170 parts of a mixture consisting of 130 parts water and 40 parts alcohol is added to 300 parts of the above casein base product, a solution thin enough for use as a coating composition is obtained.

A product such as that described above is especially valuable as a coating composition. For example, when used on fibre or wood cartons a coating is secured that is greaseproof, and after drying is substantially insoluble. Other coatings such as lacquers, varnishes, paints, shellac, etc., may be applied over the casein base coating and excellent adherence between the two coatings secured. For paper coatings, as for example, where it is desired to render the paper grease and oil proof, it is sometimes desirable to add an agent to render the coating more flexible. For this purpose relatively small quantities of water soluble glycerol esters, such as those described in the Fawkes Patent 1,918,692 are especially useful. For example, 5 parts by weight of diacetin when added to 100 parts by weight of the above product will render it sufficiently flexible for most purposes. This product is also useful for coating fabrics such as cotton cloth, and other woven fabrics to provide a flexible grease and oil proof fabric, that is also water resistant.

Because of the unusual adherence of these products to substantially all types of surfaces, a coating composition such as that described above is especially useful for sealing in stains such as oil stains that have a tendency to bleed. For example, when an oil stain, or spirit soluble dyestuff, such as a mahogany or walnut stain, has been used on wood it is almost impossible to coat the wood with a white enamel without the stain bleeding into the white enamel and causing discoloration. By coating the stained surface with a composition such as that described above, white enamel may then be applied without any trace of bleeding. Furthermore, there is improved adherence between the coats, both as to the original coat, whether it be varnish, lacquer or paint, and the final coat, than is obtained by the use of ordinary glue as is ordinarily practice at the present time.

*Example 6*

|  | Parts by weight |
|---|---|
| Formaldehyde (40% by volume) | 126 |
| Urea | 180 |
| Barium hydroxide | .5 |
| Water | 100 |

After the urea has dissolved, allow to stand until the reaction between the urea and formaldehyde is complete. The solution may be heated to increase the rate of reaction but this is not necessary. If allowed to stand too long a white precipitate may settle out. Usually the reaction is complete in from 4 to 24 hours. The solution may then be filtered. To the solution thus obtained there is added:

|  | Parts by weight |
|---|---|
| Triethanolamine | 5 |
| Water | 100 |
| Casein | 200 |

The above proportions produce a viscous solution suitable as a waterproof adhesive. It is especially useful on wood veneers since for some reason unknown to us, such products produce almost no warpage of the wood. After drying, the adhesive is not appreciably affected by moisture conditions, or for that matter, water itself. Furthermore, by the addition of a relatively small amount of plasticizing agent, adhesives such as that described above can be made which have a high degree of flexibility and still retain their adhesive properties. Such adhesives, when used on veneers, do not tend to dry out and become brittle.

*Example 7*

To 300 parts by weight of a composition such as that described in Example 4, there is added a mixture consisting of 130 parts by weight of water and 40 parts by weight of denatured alcohol. To the solution thus obtained there is added suitable pigments to produce a paint-like material. For example the addition of:

80 parts by weight of asbestine
120 parts by weight of calcium carbonate
350 parts by weight of lithopone produces a white coating suitable for many uses. It is preferable, but not essential, to disperse the pigments by grinding as, for example, in a dough mixer, pebble mill, stone mill or roller mill. The composition may be further thinned by the addition of water or mixtures of water and alcohol. This coating material is especially useful on plaster and cement surfaces either as a priming coat or as a complete finish. A coating such as that described above is especially useful as a priming coat on plaster where a lacquer finish, such as that described in the copending Wilson application Serial No. 627,272, is to be applied. It may also be used to prevent stain bleeding, and as a cold water paint for either indoor or outdoor use.

It is, of course, to be understood that other pigments may be used, to produce any desired color. For example, titanium oxide, ferrite yellow, iron oxide, ultramarine blue, and other pigments may be substituted in whole or in part for the pigments given above. Furthermore, the proportion of pigment to vehicle may be varied within wide limits, as will be readily understood.

We have found that white coatings can be made by our process that retain their color to a remarkable degree and are relatively free from yellowing tendencies.

*Example 8*

To 160 parts by weight of an approximately 50% water solution of a urea-thiourea-formaldehyde resinous condensation product, such as that described in U. S. Patent 1,926,786, there is added:

|  | Parts by weight |
|---|---|
| Ammonia | 16 |
| Sodium fluoride | 5 |
| Urea | 140 |
| Water | 240 |
| Casein | 240 |
| Diacetin | 18 |

This produces a viscous solution, suitable for use as an adhesive. For example, it is useful for wood veneer work, for fastening wood to metal, and as a general household cement. It has good keeping qualities, and after drying is highly water and moisture resistant, and has good flexibility.

If desired silica or other inert fillers may be added, to aid in filling rough surfaces to be joined together, and to prevent shrinkage.

Where casein is used as the protein material, it is usually desirable to use an alkaline material. While we have shown the use of ammonia, triethanolamine and barium hydroxide it is to be understood that other alkaline materials may be used such as borax, trisodium phosphate, sodium or calcium hydroxide and other bases well-known in the production of casein solutions.

Solutions made by our process are useful for many purposes; and both the process and products may be varied to produce products meeting definite requirements. For example, our products are useful for finishing fibrous or absorbent surfaces such as paper, cardboard, fibre furniture and the like. It is also suitable for use as a coating on chip board, fibre board, and other folding paper box board, for the production of grease and oil proof cartons. In the production of such cartons it is sometimes desirable but not necessary to put a coating of a cellulose ester base lacquer over the protein-urea-derivative coating. Our process provides a product giving a perfect bond between the two coating materials, even under moist or wet conditions and prevents the absorption of solvent or "lacquer odors" by the paper structure. Furthermore, because of the excellent adherence of our materials to oil paints, air drying varnishes and the like, and its impermeability to lacquer solvents, it is valuable as a barrier coat to prevent the "lifting" of paints, varnishes etc. that are to be finished with lacquers. We have also found that products made according to our invention are exceptionally well suited for use as a primer or size coat over plaster, cement and the like. Plaster walls, for example, may be finished by applying a protein-urea-derivative coating and then applying a cellulose derivative base lacquer such as that described in said copending Wilson application, Serial No. 627,272, over the size or primer. Adhesives that are resistant to water, or are waterproof may be made by our process as hereinbefore mentioned. Our products are also useful in the production of artificial leather, stencil sheets, leather cements and for many other purposes. Furthermore, we have found that the products of our invention, when applied to other protein base materials as for example leather, gut strings and the like, not only increases the tensile strength of the leather or gut, but also greatly increases the wet strength and acts to prevent swelling.

While among other things we have described the use of urea-aldehyde derivatives which cause protein materials to become relatively insoluble after evaporation of the solvent, it should be understood that where it is desirable, we may treat the material after it has been applied with formaldehyde or other tanning or coagulating agents. Or, for that mater, we may add formaldehyde or formaldehyde derivatives which will engender formaldehyde directly to the solution prior to its application. Other well known tanning or coagulating agents such as chromates, syntans, quinons and the like may also be used.

It is to be understood that modifying agents such as dyes, pigments, and other coloring agents; extenders such as silica, clay and the like may be added to our composition without departing from the spirit of our invention. Also we may use additional well-known plasticizing agents such as glycerine, Turkey red oil and the like. The use of glycerol esters, as described in U. S. Patent 1,918,692, is especially advantageous for many purposes. Oils, waxes, fats and resinous materials may also be added to produce various desired modifications.

We claim:

1. The process of mixing a urea and formaldehyde in proportions to react, combining substantially all of the formaldehyde with the urea in an aqueous alkaline medium to form a water soluble reaction product, and dissolving a protein in said aqueous alkaline solution.

2. The process comprising co-reacting formaldehyde with a mixture of urea and thiourea in an aqueous alkaline medium to produce a water-soluble product wherein substantially all of the formaldehyde is chemically combined with the urea and thiourea, and making an aqueous alkaline solution of said product and a protein to provide a flowable composition.

3. The process comprising reacting formaldehyde with a urea in an aqueous alkaline solution to provide a water-soluble reaction product wherein substantially all of the formaldehyde is combined with urea, adding an alkali to the solution thus obtained and dissolving casein in the resulting solution.

4. The process comprising reacting formaldehyde with a urea in an aqueous alkaline solution to provide a water-soluble reaction product wherein substantially all of the formaldehyde is in chemical combination with the urea, and making an aqueous solution containing said reaction product, urea and casein to provide a flowable composition.

5. A flowable composition comprising an aqueous alkaline solution of a water-soluble reaction product of formaldehyde and a urea wherein substantially all of the formaldehyde is combined with the urea in an alkaline medium, and including a protein in solution therewith.

6. A flowable composition comprising an aqueous alkaline solution of a water-soluble reaction product of formaldehyde and a urea wherein substantially all of the formaldehyde is combined with the urea in an alkaline medium, and including casein in solution therewith.

7. A flowable composition comprising an aqueous alkaline solution of a water-soluble reaction product of formaldehyde with urea and thiourea wherein substantially all of the formaldehyde is combined with the urea and thiourea in an alkaline medium, and including a protein in solution therewith.

8. A flowable composition comprising an aqueous alkaline solution of a water-soluble reaction product of formaldehyde with urea and thiourea wherein substantially all of the formaldehyde is combined with the urea and thiourea in an alkaline medium, and including casein in solution therewith.

WILLIAM COURTNEY WILSON.
CHARLES ELLIOTT FAWKES.